Sept. 7, 1943.    F. E. PAYNE    2,328,578
FLUID SEAL
Filed Feb. 28, 1941
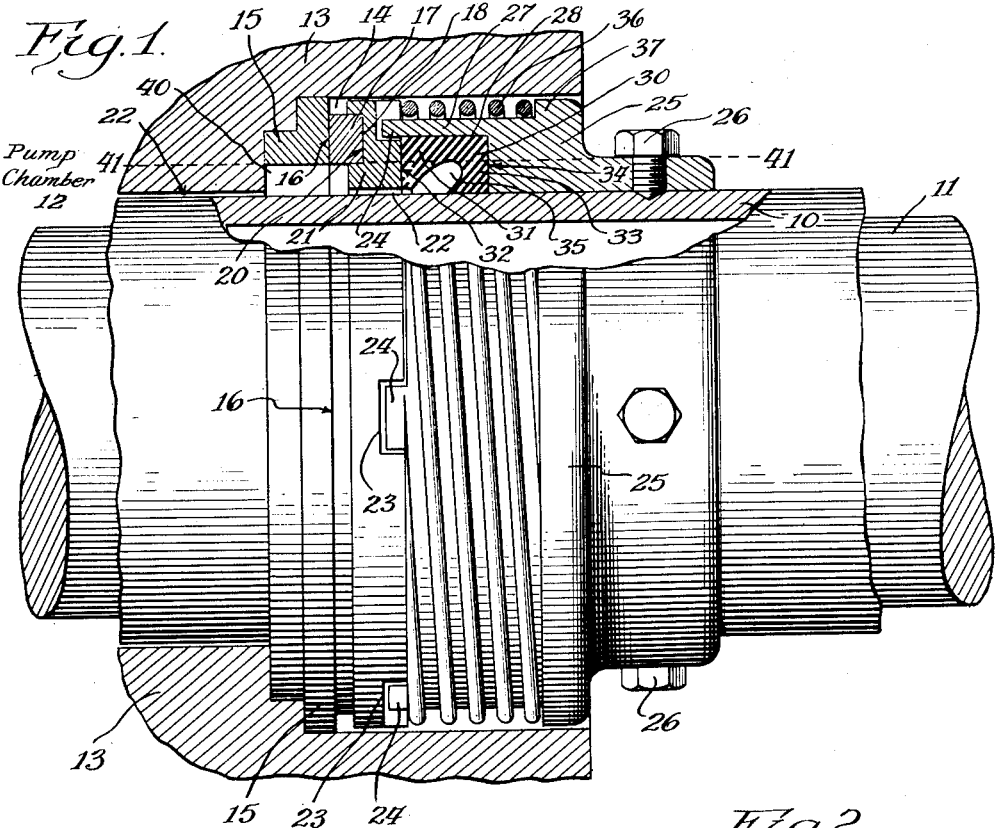
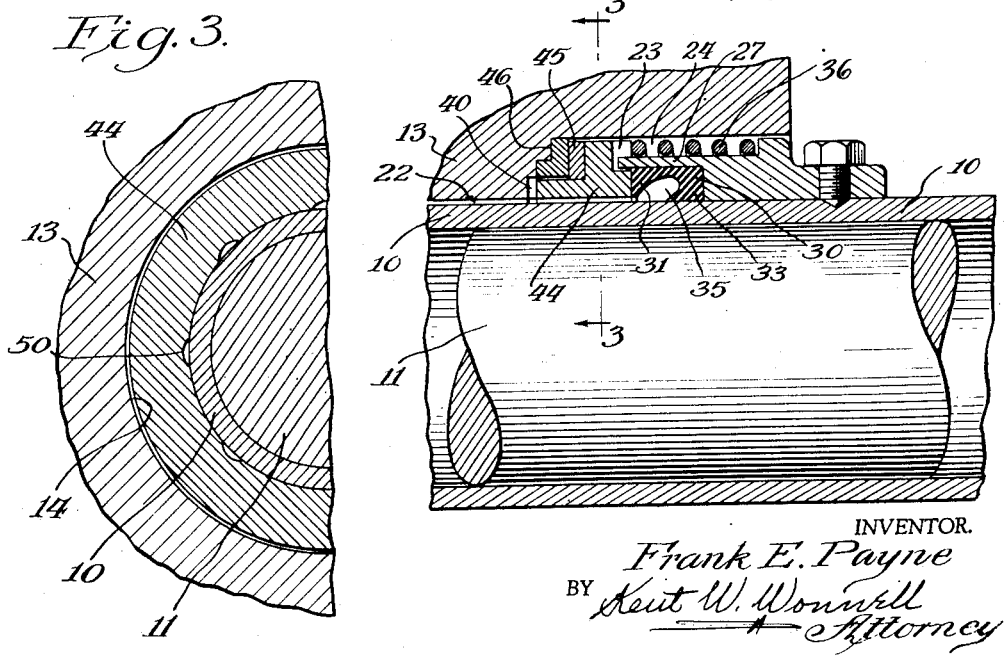
INVENTOR.
Frank E. Payne
BY Kent W. Wonnell
Attorney Patented Sept. 7, 1943

2,328,578

UNITED STATES PATENT OFFICE 2,328,578

FLUID SEAL

Frank E. Payne, Barrington, Ill., assignor to Crane Packing Company, Chicago, Ill., a corporation of Illinois Application February 28, 1941, Serial No. 380,977

3 Claims. (Cl. 286—7)

This invention relates in general to a fluid seal for rotating shafts and the like, and is more particularly described as a shaft or sleeve seal for a high pressure liquid pump.

An important object of the invention is in the provision of a seal to surround a rotatable shaft, or the like, adapted to utilize the pressure developed by the pump for equalizing, balancing or opposing the pressure of the pump in the seal in such a manner that there is a minimum of sealing friction in maintaining a fluid-tight joint.

A further object of the invention is in the provision of a fluid seal in which the high pressure produced by the pump is substantially balanced in the seal, and the sealing members are maintained in their proper positions at rest and their sealing effort is increased by coil spring retainers or holders.

A still further object of the invention is in the provision of a seal formed of flexible and resilient material and provided with an interior pocket or formed in opposite sections between which pressure is applied for balancing or opposing pressure to produce a seal for fluid under high pressure.

Other and further objects of the invention will appear hereinafter and will be apparent from the accompanying drawing in which, Fig. 1 is a view partly in section of a fluid seal in accordance with this invention as applied to the surrounding sleeve of a rotatable shaft extending from a pump chamber in which high pressure is developed;

Fig. 2 is a sectional view of a similar but slightly modified seal in accordance with the invention as applied to a pump shaft or a surrounding sleeve; and Fig. 3 is a sectional detail taken on the line 3—3 of Fig. 2.

In sealing a high pressure pump or blowing equipment around the main shaft or other rotating parts which project from or through the pump or pressure chamber, it is difficult to pack or seal the shaft to make a satisfactory fluid tight joint therewith, and to produce an adequate and satisfactory seal without undue wear or friction. The present invention provides a flexible and resilient sealing member which provides a space connected with a high pressure chamber in which the pressure is substantially balanced, but to which a compressible spring is applied for holding the sealing parts normally in proper sealing position when the equipment is not in use, and also for maintaining it in the proper place and under suitable pressure when the equipment is in use.

Referring now more particularly to the drawing, a seal is shown in Fig. 1, as applied around a sleeve 10 affixed to and rotatable with a shaft 11 which extends from a pump chamber 12 out of or through a housing 13.

At the inner edge of the housing surrounding the shaft is a recess 14 in which a wearing ring 15 is tightly seated, providing a sealing surface 16 for a lapped sealing member 17 which may be formed of carbon, Bakelite, fibre, or other suitable low friction material. This sealing member may be seated in a recess 18 and makes a fluid-tight connection with the sealing surface 20 of a gland member 21 which fits more or less loosely around the sleeve 10, leaving a leakage space or passage 22 along the sleeve communicating with the interior of the pump or pressure chamber 12.

At the outer edge of the gland member 21 are notches 23 for receiving corresponding tongues or projections 24 of a driving casing 25 which extends along the sleeve to which it is secured by bolts 26 or other fastening devices to rotate it with the shaft 11. The projections 24 are at the edge of a flange 27 which projects toward the gland members forming an inner seal receiving recess 28 substantially rectangular in cross section.

Fitting closely within the space or recess 28 surrounding the shaft is a seal 30 of flexible resilient material such as rubber, Neoprene, or the like, having a portion 31 to abut the outer face 32 of the gland member 21 at right angles to the shaft, and another portion 33 to fit against an inner contact surface 34 within the casing and against and in contact with the shaft 11. The seal is also formed with an interior chamber or space 35 which is annular or circular in form and is preferably undercut at one edge of the inside of the chamber when applied to a shaft and it connects at its opposite inner edge with the passageway or space 22 along the shaft or sleeve within the casing and within the gland member 21 so that the pressure within the pump chamber is communicated directly to the expansion and compression chamber 35 within the seal.

The seal 30 is compressed yieldingly in place within the casing 25 free to expand by its own resilience and by pressure in the chamber 35, and its expansion is assisted by a coil spring 36 seated on the outside of flange 27 and bearing against a shoulder 37 on the casing at one end and against the outer edge of gland member 21 which projects above the flange 27 at the other end. The spring is partially compressed, is free to expand and take up any lost motion, and maintains its position and pressure whether the shaft is rotated or not. The pressure chamber 35 within the seal preferably extends slightly beyond the outer periphery of the recess 40 within the wearing ring 15 which receives pressure from the pump chamber 12, as indicated by a line 41 so that the pressure admitted to the space 35 through the passageway 22 is substantially balanced within the seal in both directions being opposed on the outer side by the casing 25 and on the other side by the gland member 21 so that no undue load is applied by unbalanced pressure to the seal 17 which forms the frictional engagement between the rotating shaft and the stationary casing. The member 21 is subject to the pressure of the pump chamber 12 in the recess 40 at one side and to the same pressure in the seal chamber 35. If the height of the chamber, or its distance from the shaft or sleeve is the same as that of the chamber, so that their effective opposite pressure areas are the same, the pressure on opposite sides of member is substantially balanced. If the pressure area of the seal member is greater, the gland member is pressed inwardly, and if less, it is pressed outwardly. When substantially balanced, the pressure of the spring 36 maintains the sealing friction of the sealing member 17.

A somewhat similar mechanical structure is shown in Fig. 2 in which the gland member 44 extends under the frictional seal and the wearing ring 46, and the sealing member 45 is in the form of a ring or disc between the ring and gland member. In this form of the invention, the operation is the same, that is, the compression chamber 35 receives pressure or leakage from the pump along the shaft or sleeve, forces the portions 31 and 38 of the seal against the sealing surface of the gland member 44 and forces the sealing portion 33 in contact with the shaft or with the liner 10 which may be secured to the shaft.

In both cases the seal housing or casing turns with the shaft and rotates the seal within the casing and rotates the frictional sealing member with respect to the stationary housing and its wearing ring secured thereto. The pressure of the seal being balanced or suitably equalized within the casing which is rotated with the shaft, leaves only the pressure of the spring 36 plus a slight unbalanced load applied to the frictional seal between the parts rotating with the shaft and the stationary casing, so that no undue pressure is placed upon the frictional member (17 or 45) which forms the sealing engagement between the stationary and rotating parts.

Instead of relying upon any leakage space between the gland member and the shaft or sleeve to which it is applied, the inner periphery of the gland member, as 44, may be provided at intervals with shallow transverse grooves 50 and the pump housing or bearing may have similar passages.

In these forms, it will be evident that the pressure produced by the apparatus itself is substantially balanced at all times and a sufficient pressure for sealing and maintaining the parts in proper operating position is produced by the pressure of a spring which can be selected and predetermined so that the pressure on the friction member between the fixed and rotating parts will not be excessive.

I claim:

1. In a fluid pressure seal, means forming an annular recess around a shaft having an opening at one end and a gland member movable in the open end, a flexible and resilient ring member with an annular chamber open at the inside around the shaft and having an entry thereto at the edge adjacent the gland member, and means for limiting the effective pressure against the outer side of the gland member to not more than the depth of the recess of the ring member so that the pressure on opposite sides of the gland member will be substantially equal.

2. In a pressure fluid seal, a shaft and means forming an annular recess about the shaft open at one end and having a gland member movable in the open end, a frictional sealing member at the outer side of the gland member, spring means between the gland member and said means tending to press the frictional sealing member into sealing engagement, and a flexible and resilient ring member having an annular chamber opening at the inside around the shaft and a fluid pressure entry thereto at the edge of the ring member adjacent the gland member, the outer diameter of the said chamber being substantially the same as the inner diameter of the frictional sealing member to equalize pressure on opposite sides of the gland member so that the same pressure of the spring means is effective against the frictional sealing member regardless of the internal pressure on the ring member.

3. A pressure fluid seal comprising a pressure containing housing, a shaft extending therefrom with a recess in the housing surrounding the shaft, a seal casing secured to and rotatable with the shaft having an annular recess around the shaft with an end opening within the recess of the housing, a gland member movable in the open end of the annular recess, a frictional sealing member engaging the housing and also engaging the outer side of the gland member, resilient means interposed between the outside of the casing and the outside of the gland member tending to press the frictional sealing member in sealing engagement with the housing, and a flexible and resilient ring sealing member disposed in the seal casing and engaging the gland member, the ring member having an annular chamber opening at the inside around the shaft and an entry thereto at one edge adjacent the gland member, the opposite side of the chamber being undercut to provide inside portions in contact with the shaft, and the chamber having an outside diameter substantially equal to that of the inside diameter of the friction sealing member to equalize the pressure on both sides of the gland member.

FRANK E. PAYNE.